(12) United States Patent
Nakamura et al.

(10) Patent No.: US 6,332,622 B1
(45) Date of Patent: Dec. 25, 2001

(54) SUSPENSION APPARATUS HAVING TWO INTERCONNECTED SHOCK ABSORBERS

(75) Inventors: Kenichi Nakamura, Kanagawa-ken; Takashi Nezu, Tokyo; Yoshiko Mihara, Kanagawa-ken, all of (JP)

(73) Assignee: Tokico, Ltd., Kanagawa-Ken (JP)

( * ) Notice: Subject to any disclaimer, the term of this patent is extended or adjusted under 35 U.S.C. 154(b) by 0 days.

(21) Appl. No.: 09/513,190

(22) Filed: Feb. 25, 2000

(30) Foreign Application Priority Data

Feb. 26, 1999 (JP) .................................................. 11-050473
Dec. 22, 1999 (JP) .................................................. 11-365194

(51) Int. Cl.[7] .................................................. B60G 11/26
(52) U.S. Cl. .................................. 280/124.159; 188/266.5
(58) Field of Search ............................ 188/266.5, 266.1, 188/266.6, 266.2, 322.15; 280/124.104, 124.106, 124.159, 124.158, 124.157, 124.56

(56) References Cited

U.S. PATENT DOCUMENTS

| | | | |
|---|---|---|---|
| 4,683,992 | * | 8/1987 | Watanabe .......................... 188/266.5 |
| 4,752,062 | * | 6/1988 | Domenichini .................. 280/124.159 |
| 4,938,499 | * | 7/1990 | Kawabata ......................... 280/124.19 |
| 4,943,084 | * | 7/1990 | Fukunaga et al. ............. 280/124.159 |
| 5,058,868 | * | 10/1991 | Sirven ........................... 280/124.159 |
| 5,207,300 | * | 5/1993 | Engel et al. ....................... 188/266.5 |
| 5,547,211 | * | 8/1996 | Runkel ........................... 280/124.159 |

* cited by examiner

*Primary Examiner*—Matthew C. Graham
(74) *Attorney, Agent, or Firm*—Wenderoth, Lind & Ponack, L.L.P.

(57) ABSTRACT

The pilot suspension apparatus of the present invention is capable of biasing a damping valve in a direction for closing the valve, due to application of a pilot pressure. The suspension apparatus comprises at least one pair of hydraulic shock absorbers which are capable of controlling a damping force and which are connected by a connecting pipe. The at least one pair of hydraulic shock absorbers are provided at front and rear wheels or left and right wheels on the same side of a vehicle or are provided in a diagonally shaped relationship. A control valve is provided so as to control the pilot pressure. The control valve is adapted to be controlled by application of a differential pressure which is generated between respective cylinders of the at least one pair of shock absorbers.

22 Claims, 4 Drawing Sheets

SUSPENSION APPARATUS HAVING TWO INTERCONNECTED SHOCK ABSORBERS

BACKGROUND OF THE INVENTION

The present invention relates to a suspension apparatus for a vehicle, such as an automobile.

Generally, in a suspension apparatus for an automobile, comprising a hydraulic shock absorber generating damping force, a small damping force is desired while driving in a straight line, from the viewpoint of ease in absorbing vibration and obtaining good riding quality. On the other hand, a large damping force is desired during braking, acceleration or cornering, from the viewpoint of suppressing pitching and rolling of the vehicle body and obtaining good steering stability. Therefore, there has been conventionally employed a suspension control apparatus comprising: a hydraulic shock absorber capable of controlling a damping force; an actuator for switching the damping force; a controller which controls an operation of the actuator; and various sensors which detect an acceleration of the vehicle body, etc. In this suspension control apparatus, the damping force is controlled appropriately according to a road surface condition, a vehicle running condition, etc., so as to obtain good riding quality and steering stability.

The above-mentioned suspension control apparatus requires use of various electronic devices, such as the controller and the actuator. These electronic devices are expensive, and further require costs for ensuring reliability of the devices. As a countermeasure, Unexamined Japanese Patent Application Public Disclosure No. 10-213171 proposes a suspension apparatus in which hydraulic shock absorbers provided at left and right wheels of a vehicle are connected through a pipe to each other. In this apparatus, a spool provided in a piston rod in the hydraulic shock absorber is moved by utilizing a difference in hydraulic pressure in the left-handed and right-handed hydraulic shock absorbers, to thereby adjust a damping force of the hydraulic shock absorber automatically according to a vehicle running condition.

Thus, there has been an increasing demand for a suspension apparatus which is capable of adjusting a damping force of the hydraulic shock absorber mechanically and automatically according to a vehicle running condition, without using electronic devices such as a controller and an actuator. In addition, it has been required to develop a suspension apparatus which has a simple construction and which is capable of generating an appropriate damping force according to a vehicle running condition, by adjusting damping force characteristics in a wide range.

SUMMARY OF THE INVENTION

In view of the above, the present invention has been made. It is an object of the present invention to provide a suspension apparatus which is capable of adjusting a damping force automatically according to a vehicle running condition and which has a simple construction and is capable of generating an appropriate damping force by adjusting damping force characteristics in a wide range.

According to the present invention, there is provided a pilot suspension apparatus capable of biasing a damping valve in a direction for closing the valve, due to application of a pilot pressure, the suspension apparatus comprising:

at least one pair of hydraulic shock absorbers capable of controlling a damping force, the at least one pair of hydraulic shock absorbers being provided at front and rear wheels or left and right wheels on the same side of a vehicle or being provided in a diagonally spaced relationship;

a connecting pipe for connecting the at least one pair of hydraulic shock absorbers; and a control valve for controlling the pilot pressure, the control valve being adapted to be controlled by application of a differential pressure generated between respective cylinders of the at least one pair of shock absorbers.

The foregoing and other objects, features and advantages of the present invention will be apparent from the following detailed description and appended claims taken in connection with the accompanying drawings.

DETAILED DESCRIPTION OF THE INVENTION

Hereinbelow, embodiments of the present invention are described in detail, referring to the accompanying drawings.

Figure 1:
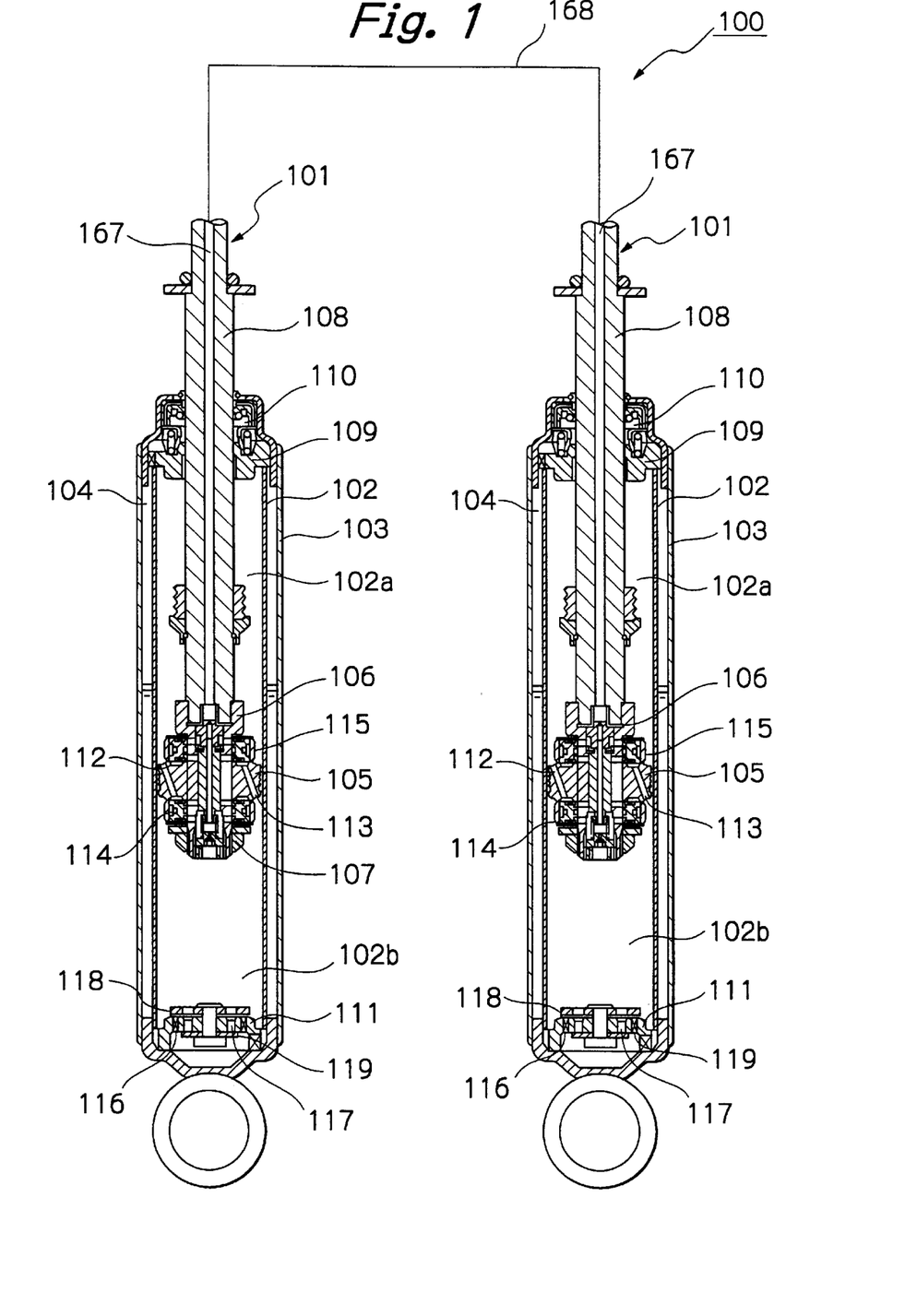
FIG. 1 is a vertical cross-sectional view showing damping force control type hydraulic shock absorbers which are applied to a suspension apparatus in a first embodiment of the present invention.
Figure 2:
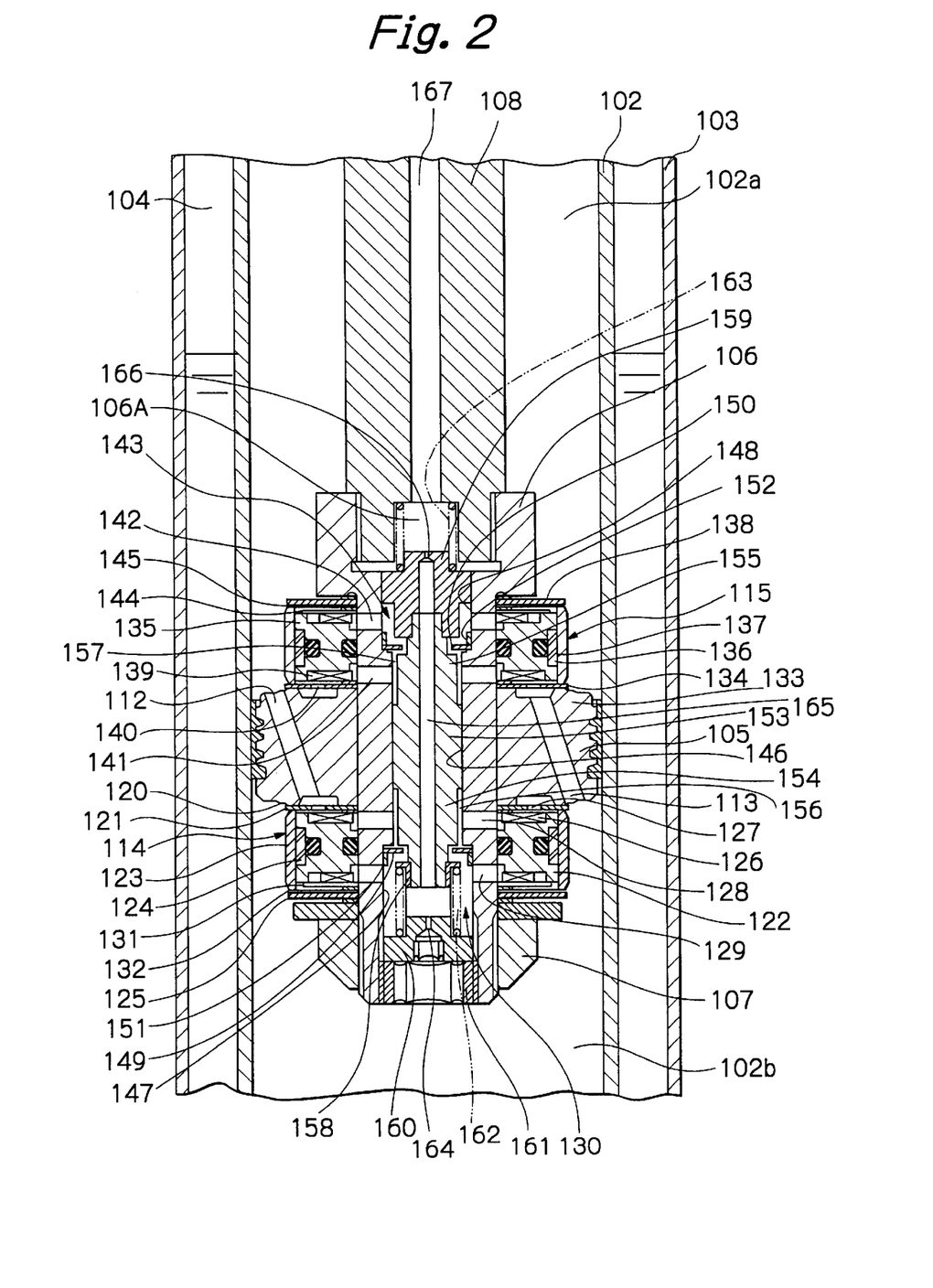
FIG. 2 is an enlarged view of a damping force generating mechanism of the hydraulic shock absorber of FIG. 1.

A first embodiment of the present invention is described, with reference to FIGS. 1 and 2. As shown in Pigs. 1 and 2, a suspension apparatus 100 in the first embodiment of the present invention comprises two damping force control type hydraulic shock absorbers 101. Each hydraulic shock absorber 101 comprises a dual cylinder including an inner cylinder 102 and an outer cylinder 103 provided outside the cylinder 102. A reservoir 104 is formed between the cylinders 102 and 103. A piston 105 is slidably provided in the cylinder 102 so as to divide an interior of the cylinder 102 into an upper cylinder chamber 102a and a lower cylinder chamber 102b. A generally cylindrical piston bolt 106 extending through the piston 105 is fixed by a nut 107. A proximal end portion of the piston bolt 106 is threadably engaged with one end portion of a piston rod 108 having a hollow structure. The piston rod 108 on a side opposite to the piston bolt 106 extends to the outside of the cylinder 102 through the upper cylinder chamber 102a and a rod guide 109 and an oil seal 110 provided at an upper end portion of the cylinder 102 and outer cylinder 103. A base valve 111 for separating the lower cylinder chamber 102b and the reservoir 104 is provided at a lower end portion of the cylinder 102.

An extension-stroke fluid passage 112 and a compression-stroke fluid passage 113 are formed in the piston 105, so as to enable communication between the upper cylinder chamber 102a and the lower cylinder chamber 102b. An extension-stroke damping force generating mechanism 114 is provided between the piston 105 and the nut 107, so as to control flow of a hydraulic fluid in the extension-stroke fluid passage 112. A compression-stroke damping force generating mechanism 115 is provided between the piston 105 and the proximal end portion of the piston bolt 106, so as to control flow of the hydraulic fluid in the compression-stroke fluid passage 113. Fluid passages 116 and 117 are provided in the base valve 111, so as to enable communication between the lower cylinder chamber 102b and the reservoir 104. A check valve 118 is provided on the base valve 111 so as to permit flow of the hydraulic fluid through the fluid passage 116 only from the reservoir 104 to the lower cylinder chamber 102b. Further, a disk valve 119 is provided on the base valve 111. When a pressure of the hydraulic fluid in the lower cylinder chamber 102b has reached a predetermined level, the disk valve 119 opens, to thereby permit flow of the hydraulic fluid from the lower cylinder chamber 102b through the fluid passage 117 to the reservoir 104. The hydraulic fluid is sealably contained in the cylinder 102. The hydraulic fluid and a gas having a predetermined pressure are sealably contained in the reservoir 104.

Next, the extension-stroke damping force generating mechanism 114 is described in detail, mainly with reference to FIG. 2. A protruding annular valve seat 120 is formed on an end surface of the piston 105 on a side of the lower cylinder chamber 102b, and a main disk valve (or a damping valve) 121 is seated over the valve seat 120. An annular fixing member 122 is attached to the piston bolt 106 between the piston 105 and the nut 107. A movable ring 123 is slidably fitted onto an outer circumferential surface of the fixing member 122. A slide ring 124 made of fluororesin is provided between the fixing member 122 and the movable ring 123. The slide ring 124 seals a space between the fixing member 122 and the movable ring 123 and enables smooth sliding movement of the movable ring 123. The movable ring 123 abuts against the main disk valve 121 under force of a disk-like leaf spring 125 clamped between the fixing member 122 and the nut 107, thus forming a pilot chamber 126 between the main disk valve 121 and the fixing member 122. An internal pressure of the pilot chamber 126 is applied in a direction for closing the main disk valve 121. The pilot chamber 126 is communicated with the extension-stroke fluid passage 112 through a fixed orifice 127 provided in the main disk valve 121. Further, the pilot chamber 126 is communicated through fluid passages 128 and 129 provided in a side wall of the piston bolt 106 with the side of the fixing member remote from the pilot chamber 126 through an extension-stroke variable pressure control valve (or a sub damping valve) 130, which is provided in the piston bolt 106. The pilot chamber 126 is also communicated with the lower cylinder chamber 102b through a check valve (or a disk valve) 131 on the fixing member 122 and a fluid passage (a cut portion) 132 in the leaf spring 125.

Next, the damping force generating mechanism 115 is described in detail. The damping force generating mechanism 115 has substantially the same structure as the extension-stroke damping force generating mechanism 114. A protruding annular valve seat 133 is formed on an end surface of the piston 105 on a side of the upper cylinder chamber 102a, and a main disk valve (or a damping valve) 134 is seated over the main disk valve 133. An annular fixing member 135 is attached to the piston bolt 106 between the proximal end portion thereof and the piston 105. A movable ring 137 is slidably fitted onto an outer circumferential surface of the fixing member 135. A slide ring 136 is provided between the fixing member 135 and the movable ring 137. The movable ring 137 abuts against the main disk valve 134 under force of a digk-like leaf spring 138, thus forming a pilot chamber 139 between the main disk valve 134 and the fixing member 135. An internal pressure of the pilot chamber 139 is applied in a direction for closing the main disk valve 134. The pilot chamber 139 is communicated with the compression-stroke fluid passage 113 through a fixed orifice 140 provided in the main disk valve 134. Further, the pilot chamber 139 is communicated through fluid passages 141 and 142 provided in the side wall of the piston bolt 106 with the side of the fixing member remote from the pilot chamber 139 through a compression-stroke variable pressure control valve (or a sub damping valve) 143, which is provided in the piston bolt 106. The pilot chamber 139 is also communicated with the upper cylinder chamber 102a through a check valve (or a disk valve) 144 on the fixing member 135 and a fluid passage (a cut portion) 145 in the leaf spring 138.

Next, the extension-stroke and compression-stroke variable pressure control valves 130 and 143 are described in detail below. A small-diameter bore 146 to which the fluid passages 128 and 141 are open is formed at a central portion of the piston bolt 106. Large-diameter bores 147 and 148 to which the fluid passages 129 and 142 are open are formed on opposite sides of the small-diameter bore 146. Stepped portions are provided between the small-diameter bore 146 and the large-diameter bores 147 and 148. These stepped portions abut against outer peripheral portions of annular sub disk valves 149 and 150. The sub disk valves 149 and 150 are fixed by rings 151 and 152 press-fitted into the large-diameter bores 147 and 148.

A cylindrical slider (a valve member) 153 is slidably provided in the small-diameter bore 146. Small-diameter portions 154 and 155 are formed on opposite end portions of the slider 153, and annular valve chambers 156 and 157 communicated with the fluid passages 128 and 141 are formed between the small-diameter portions 154 and 155 and the small-diameter bore 146. End portions of the small-diameter portions 154 and 155 move to and away from the sub disk valves 149 and 150, in accordance with sliding movement of the slider 153, to thereby open and close the valve chamber 156 as a flow path between the fluid passages 128 and 129 and the valve chamber 157 as a flow path between the fluid passages 141 and 142. It should be noted that when the slider 153 is located at an intermediate position, both the small-diameter portion 154 and the small-diameter portion 155 are spaced apart from the corresponding sub disk valves, i.e., the sub disk valve 149 and the sub disk valve 150.

The end portion of one small-diameter portion 154 extends through the sub disk valve 149 and a spring bearing 158 is attached to the lowermost portion of the small-diameter portion 154. The end portion of the other small-diameter portion 155 extends through the sub disk valve 150 and a pressure-receiving member 159 is attached to the uppermost portion of the small-diameter portion 155. The pressure-receiving member 159 is slidably provided in the large-diameter bore 148 of the piston bolt 106. An adjusting screw 160 is threadably engaged with the lowermost portion of the large-diameter bore 147 of the piston bolt 106 and is fixed by a lock nut 161. A compression spring 162 is provided between the spring bearing 158 and the adjusting screw 160 and a compression spring 163 is provided between the pressure-receiving member 159 and the end portion of the piston rod 108 connected to the piston bolt 106. The slider 153 is resiliently held at the intermediate position by force of these compression springs.

The lower cylinder chamber 102b is communicated with the large-diameter bore 147 through an orifice passage 164 provided in the adjusting screw 160 and is further communicated through a fluid passage 165 in the slider 153 and an orifice passage 166 in the pressure-receiving member 159 with a fluid chamber 106A formed by the piston bolt 106 and the piston rod 108. An internal pressure of the fluid chamber 106A is applied to the pressure-receiving member 159. Further, the fluid chamber 106A is communicated with a fluid passage 167 formed in the piston rod 109. A pipe 168 (FIG. 1) is connected to the uppermost portion of the fluid passage 167. Thus, the fluid passage 167 in the piston rods 108 of the two hydraulic shock absorbers 101 are communicated with each other by the pipe 168. The hydraulic shock absorbers 101 are connected to wheel-supporting portions for left and right wheels of a vehicle.

Hereinbelow, an operation of the suspension apparatus in the above-mentioned embodiment is described.

During an extension stroke of the piston rod 108, the hydraulic fluid in the upper cylinder chamber 102a is pressurized in accordance with movement of the piston 105. In this instance, before the main disk valve 121 of the extension-stroke damping force generating mechanism 114 opens (in a low speed range of the piston speed), the hydraulic fluid flows from the upper cylinder chamber 102a to the lower cylinder chamber 102b through the extension-stroke fluid passage 112, the fixed orifice 127 of the main disk valve 121, the pilot chamber 126, the fluid passage 128, the valve chamber 156, the extension-stroke variable pressure control valve 130, the fluid passage 129, the check valve 131 and the fluid passage 132. When the pressure in the upper cylinder chamber 102a reaches the valve opening pressure for the main disk valve 121 (a high speed range of the piston speed), the main disk valve 121 opens, to thereby permit flow of the hydraulic fluid directly from the extension-stroke fluid passage 112 to the lower cylinder chamber 102b. It should be noted that the hydraulic fluid in a volume corresponding to that of the portion of the piston rod 108 which has escaped from the cylinder 102 flows from the reservoir 104 to the lower cylinder chamber 102b through the check valve 118 in the fluid passage 116 of the base valve 111.

By this arrangement, before the main disk valve 121 opens (in the low speed range of the piston speed), the damping force is generated by the fixed orifice 127 and the extension-stroke variable pressure control valve 130. In the extension-stroke variable pressure control valve 130, when the slider 153 is located at the intermediate position, the end portion of the small-diameter portion 154 is spaced apart from the sub disk valve 149, so that the sub disk valve 149 is open. When the slider 153 moves toward the adjusting screw 160, the end portion of the small-diameter portion 154 abuts against the sub disk valve 149, so that the sub disk valve 149 is closed and the valve opening pressure for the sub disk valve 149 becomes high. In this instance, the pressure in the upstream pilot chamber 126 changes in accordance with the valve opening pressure for the sub disk valve 149. The pressure in the pilot chamber 126 is applied in a direction for closing the main disk valve 121 as a pilot pressure. Therefore, not only the valve opening pressure for the sub disk valve 149, but also the valve opening pressure for the main disk valve 121 can be adjusted, thus making it possible to control the damping force in the high speed range of the piston speed and the damping force in the low speed range of the piston speed at the same time.

During a compression stroke of the piston rod 108, the check valve 118 in the base valve 111 is closed in accordance with movement of the piston 105, to thereby pressurize the hydraulic fluid in the lower cylinder chamber 102b. In this instance, before the main disk valve 134 of the damping force generating mechanism 115 opens (in the low speed range of the piston speed), the hydraulic fluid flows from the lower cylinder chamber 102b to the upper cylinder chamber 102a through the compression-stroke fluid passage 113, the fixed orifice 140 of the main disk valve 134, the pilot chamber 139, the fluid passage 141, the valve chamber 157, the compression-stroke variable pressure control valve 143, the fluid passage 142, the check valve 144 and the fluid passage 145. When the pressure in the lower cylinder chamber 102b reaches the valve opening pressure for the main disk valve 134 (the high speed range of the piston speed), the main disk valve 134 opens, to thereby permit flow of the hydraulic fluid directly from the compression-stroke fluid passage 113 to the upper cylinder chamber 102a. It should be noted that the hydraulic fluid in a volume corresponding to that of the portion of the piston rod 108 which has entered the cylinder 102 flows from the lower cylinder chamber 102b to the reservoir 104 through the disk valve 119 in the fluid passage 116 of the base valve 111.

By this arrangement, before the main disk valve 134 opens (in the low speed range of the piston speed), the damping force is generated by the fixed orifice 140 and the compression-stroke variable pressure control valve 143. In the compression-stroke variable pressure control valve 143, when the slider 153 is located at the intermediate position, the end portion of the small-diameter portion 155 is spaced apart from the sub disk valve 150, so that the sub disk valve 150 is open. When the slider 153 moves toward the piston rod 108, the end portion of the small-diameter portion 155 abuts against the sub disk valve 150, so that the sub disk valve 150 is closed and the valve opening pressure for the sub disk valve 150 becomes high. In this instance, the pressure in the upstream pilot chamber 139 changes in accordance with the valve opening pressure for the sub disk valve 150. The pressure in the pilot chamber 139 is applied in a direction for closing the main disk valve 134 as a pilot pressure. Therefore, not only the valve opening pressure for the sub disk valve 150, but also the valve opening pressure for the main disk valve 134 can be adjusted, thus making it possible to control the damping force in the high speed range of the piston speed and the damping force in the low speed range of the piston speed at the same time.

The left-handed and right-handed hydraulic shock absorbers 101 are connected by the pipe 168, so as to permit communication between the respective fluid chambers 106A, each provided on one side of the slider 153. While the vehicle is being driven in a straight line, the phase of the stroke of the piston rod 108 in one hydraulic shock absorber 101 is equal to that in the other hydraulic shock absorber 101, relative to vertical movement of the vehicle. Therefore, the two hydraulic shock absorbers 101 become substantially equal in terms of a pressure introduced from the lower cylinder chamber 102b through the orifice passage 164 into the large-diameter bore 148 on the other side of the slider 153, so that the slider 153 in each hydraulic shock absorber 101 is held at the intermediate position. Consequently, the extension-stroke and compression-stroke variable pressure control valves 130 and 143 are open, to thereby generate a small damping force during the extension stroke and the compression stroke. Thus, vibration of the vehicle body can be suppressed while maintaining good riding quality.

During cornering, the phase of the stroke of the piston rod 108 in one hydraulic shock absorber 101 is opposite to that in the other hydraulic absorber 101, relative to rolling of the vehicle body. Therefore, the pressure in the lower cylinder chamber 102b (that is, the pressure in the large-diameter bore 147) in the hydraulic shock absorber during the compression stroke becomes high and the pressure in the lower cylinder chamber 102b in the hydraulic shock absorber during the extension stroke becomes low. Due to a difference in pressure in the lower cylinder chamber 102b between the two hydraulic shock absorbers, in the hydraulic shock absorber 101 during the compression stroke, the slider 153 moves toward the piston rod 108, so that the valve opening pressure for the compression-stroke variable pressure control valve 143 becomes high and the damping force for the compression stroke becomes large, and that the extension-stroke variable pressure control valve 130 opens and the damping force for the extension stroke becomes small. On the other hand, in the hydraulic shock absorber 101 during the extension stroke, the slider 153 moves toward the adjusting screw 160, so that the valve opening pressure for the extension-stroke variable pressure control valve 130 becomes high and the damping force for the extension stroke becomes large, and that the compression-stroke variable pressure control valve 143 opens and the damping force for the compression stroke becomes small. Consequently, a large damping force is applied to a change in vehicle attitude, thus effectively suppressing rolling and obtaining good steering stability.

In the extension-stroke and compression-stroke variable pressure control valves 130 and 143, a sharp rise in hydraulic fluid pressure can be relieved due to deflection of the sub disk valves 149 and 150. Therefore, it is possible to absorb large vibration inputted suddenly clue to the vehicle hitting a bump on the road surface, thereby improving riding quality. Further, with respect to the direction in which the vehicle after change in attitude returns to a horizontal position, a small damping force is generated, so that the vehicle body can be smoothly returned to the horizontal position.

The orifice passage 164 between the lower cylinder chamber 102b and the large-diameter bore 147 serves as a filter for high-frequency input vibration. Therefore, relative to the vibration of the unsprung mass (high-frequency vibration), a differential pressure is unlikely to be generated and a small damping force is maintained, so that good riding quality can be maintained. Further, an appropriate damping force can be applied to the movement of the slider 153 by virtue of the orifice passage 166 in the pressure-receiving member 159, so that malfunctioning due to self-induced vibration can be prevented.

Figure 3:
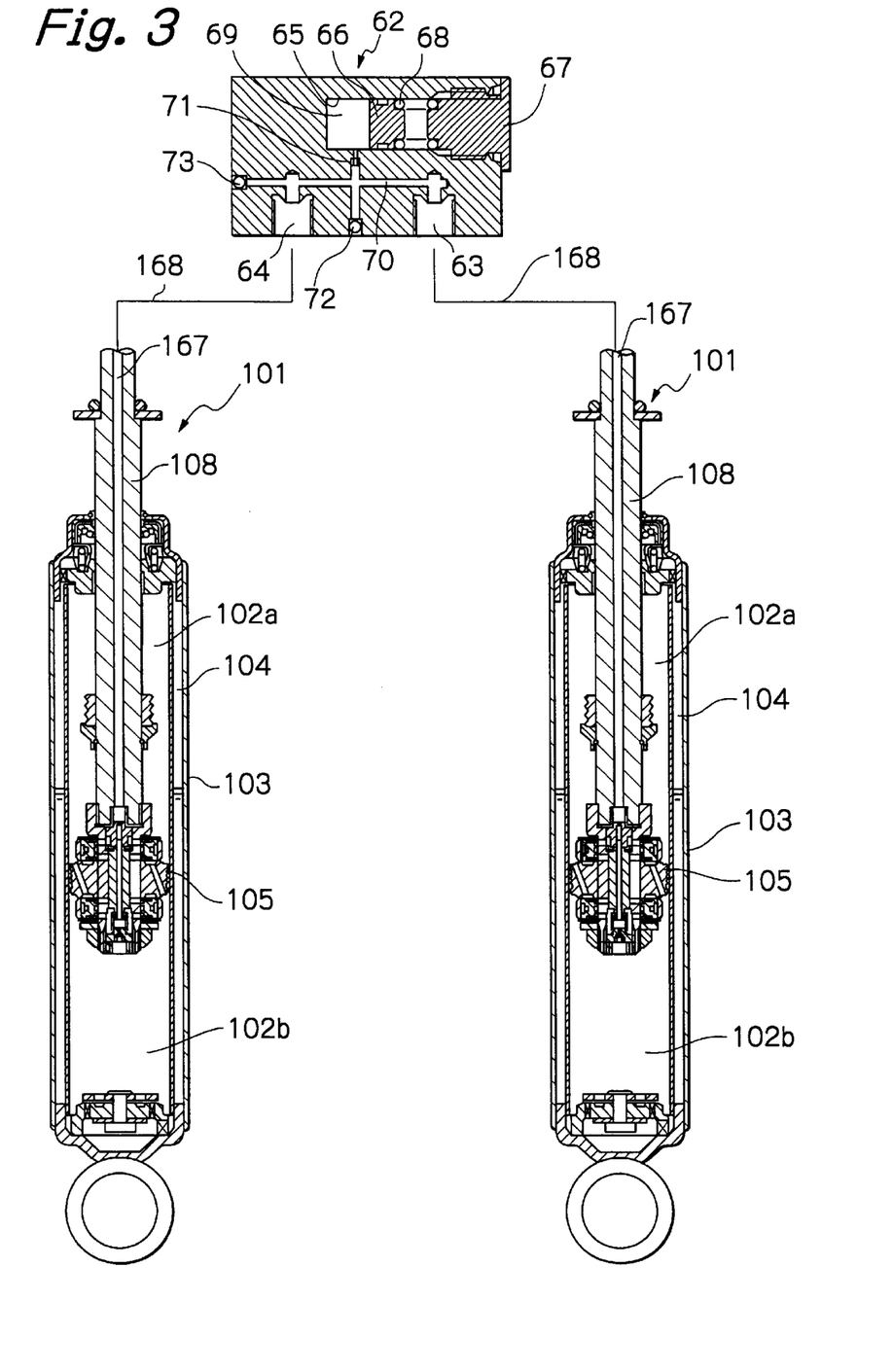
FIG. 3 is a vertical cross-sectional view showing damping force generating mechanisms of damping force control type hydraulic shock absorbers and a variable-volume chamber unit which are applied to a suspension apparatus in a second embodiment of the present invention.

Next, a second embodiment of the present invention is described, referring to FIG. 3. The second embodiment is substantially the same as the first embodiment, except that the structure of the pressure-receiving member 159 is changed and a variable-volume chamber unit 62 is provided in the pipe 168 connecting the left-handed and right-handed damping force control type hydraulic shock absorbers 101. Therefore, in FIG. 3, the same parts or portions as those shown in FIGS. 1 and 2 are designated by the same reference numerals and characters, and overlapping explanation is omitted, As shown in FIG. 3, in the suspension apparatus in the second embodiment, the orifice passage 166 for permitting communication between an upper side and a lower side of the pressure-receiving member 159 in the hydraulic shock absorber 101 is not provided, so that there is no communication between the fluid passages 165 and 167. Further, the variable-volume chamber unit 62 is connected to an intermediate portion of the pipe 168 connecting the left-handed and right-handed hydraulic shock absorbers 101.

The variable-volume chamber unit 62 includes connection ports 63 and 64 and a cylinder bore 65. The connection ports 63 and 64 are connected to the pipe 168 which are connected to the fluid passages 167 in the hydraulic shock absorbers 101. A free piston 66 is slidably provided in the cylinder bore 65. A plug 67 is attached to an open end of the cylinder bore 65 and a compression spring 68 is provided between the free piston 66 and the plug 67. A variable-volume chamber 69 having volume elasticity is formed in the cylinder bore 65 by the free piston 66. The connection ports 63 and 64 are communicated with each other through a fluid passage 70. The fluid passage 70 is communicated with the variable-volume chamber 69 through a throttle passage 71. Reference numerals 72 and 73 in FIG. 3 denote plugs.

The variable-volume chamber 69 is filled with the hydraulic fluid and is pressurized to a predetermined level by the compression spring 68. Normally, in each hydraulic shock absorber 101, the pressure in the large-diameter bore 147 balances the pressure in the fluid chamber 106A (that is, the pressure in the variable-volume chamber 69), so that the slider 153 is located at a neutral position. The flow path area of the throttle passage 71 is set to a value such that relative to the cycle of vibration of the suspension apparatus in normal running condition, the throttle passage 71 serves as a filter so that substantially no flow of the hydraulic fluid occurs between the fluid passage 70 and the variable-volume chamber 69.

Next, an operation of the suspension apparatus in the second embodiment is described.

In the cycle of vibration of the suspension apparatus in normal running condition, the throttle passage 71 serves as a filter and substantially no flow of the hydraulic fluid occurs between the fluid passage 70 and the variable-volume chamber 69. Therefore, substantially direct transmission of the hydraulic fluid pressure in the fluid chamber 106A above the slider 153 occurs between the left-handed and right-handed hydraulic shock absorbers 101 through the pipe 168.

By this arrangement, as in the case of the first embodiment, when the phase of the stroke of the piston rod 108 in one hydraulic shock absorber 101 is equal to that in the other hydraulic shock absorber 101, the two hydraulic shock absorbers 101 are balanced in terms of a pressure in the large-diameter bore 147, so that the slider 153 does not move and a small damping force is maintained. On the other hand, when the phase of the stroke of the piston rod 108 in one hydraulic shock absorber 101 is opposite to that in the other hydraulic shock absorber 101, a differential pressure is generated between the large-diameter bores 147 in the two hydraulic shock absorbers, so that the slider 153 moves in each hydraulic shock absorber and a large damping force is generated. Therefore, rolling during cornering can be effectively suppressed and good steering stability can be obtained, while maintaining good riding quality when driving in a straight line.

When the load carried by the vehicle becomes large, the height of the vehicle lowers and the piston rods 108 retract. Consequently, the internal pressure of each hydraulic shock absorber 101 increases by an amount corresponding to the portion of the piston rod 108 which has retracted into the cylinder 102 and reaches a constantly high level. This pressure is transmitted to the variable-volume chamber unit 62 through the pipe 168, and introduced into the variable-volume chamber 69 through the throttle passage 71. The compression spring 168 is compressed, to thereby increase the volume of the variable-volume chamber 69. Consequently, the hydraulic fluid in a volume corresponding to the increase in volume of the variable-volume chamber 69 flows from the fluid chambers 106A of the left-handed and right-handed hydraulic shock absorbers 101 into the variable-volume chamber 69, and the slider 153 moves toward the fluid chamber 106A in each hydraulic shock absorber, so that the valve opening pressure for the compression-stroke variable pressure control valve 143 becomes high, to thereby generate a large damping force for the compression stroke. Thus, the damping force can be increased according to an increase in the load carried by the vehicle. This avoids the problem of insufficiency of damping force for a vehicle carrying a heavy load.

Figure 4:
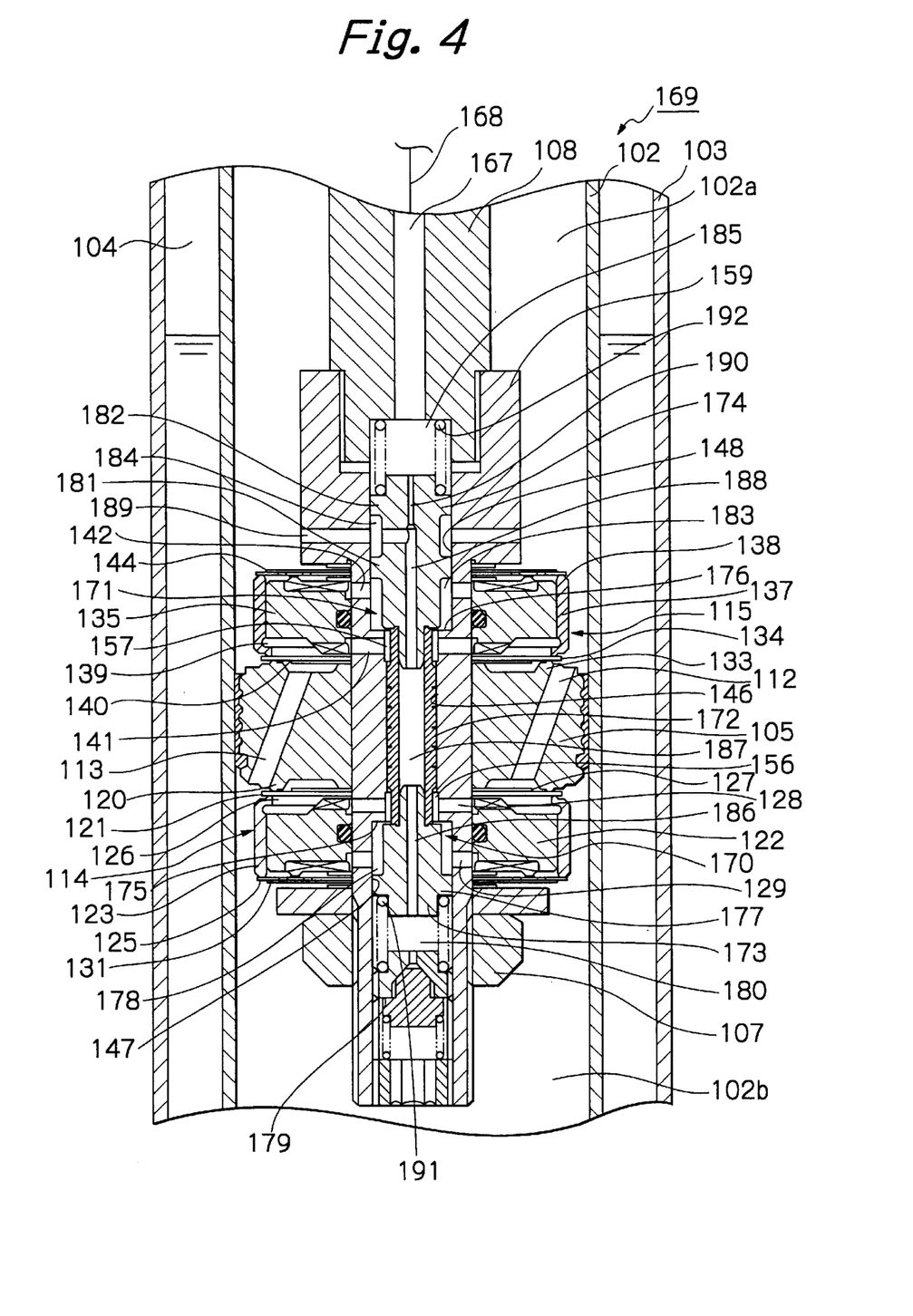
FIG. 4 is a vertical cross-sectional view of a damping force control type hydraulic shock absorber which is applied to a suspension apparatus in a third embodiment of the present invention.

A third embodiment of the present invention is described below, referring to FIG. 4.

The suspension apparatus in the third embodiment is substantially the same as that in the first embodiment, except that a part of the damping force generating mechanism of the hydraulic shock absorber is changed. Therefore, in FIG. 4, only an essential part of the hydraulic shock absorber is shown and the same parts or portions as those in the first embodiment are designated by the same reference numerals and characters, with overlapping explanation being omitted.

In a damping force control type hydraulic shock absorber 169 in the suspension apparatus in the third embodiment, in extension-stroke and compression-stroke variable pressure control valves 170 and 171, sub disk valves such as those in the first embodiment are not used. In accordance with movement of a slider 172, valve members 173 and 174 attached to opposite ends of the slider 172 are moved to and away from valve seats (stepped portions) 175 and 176 formed between the small-diameter bore 146 and the large-diameter bores 147 and 148 of the piston bolt 106. Thus, a pressure in the flow path between the fluid passages 128 and 129 and a pressure in the flow path between the fluid passages 141 and 142 are controlled. It should be noted that when the slider 172 is located at an intermediate position, both the valve member 173 and the valve member 174 are spaced apart from the corresponding valve seats, i.e., the valve seat 175 and the valve seat 176.

One valve member 173 includes a flange portion 177 and is slidably provided in the large-diameter bore 147. The valve member 173 forms a valve chamber 178 in the large-diameter bore 147, which chamber communicates with the fluid passage 129, and forms a fluid chamber 180 between the valve member 173 and a relief valve 179 attached to the lowermost portion of the large-diameter bore 147. The other valve member 174 includes two flange portions 181 and 182 and is slidably provided in the large-diameter bore 148. The valve member 174 forms a valve chamber 183 in the large-diameter bore 148, which chamber communicates with the fluid passage 142, and forms a fluid chamber 184 between the flange portions 181 and 182. The valve member 174 also forms a fluid chamber 185 between the valve member 174 and the end portion of the piston rod 108 connected to the piston bolt 106.

The fluid chamber 180 is communicated with the upper cylinder chamber 102a through a fluid passage 186 in the valve member 173, a fluid passage 187 in the slider 172, a fluid passage 188 in the valve member 174, the fluid chamber 184 and a fluid passage 189 in a piston bolt 159. The relief valve 179 opens when the pressure in the fluid chamber 180 has reached a predetermined level, and relieves the hydraulic fluid in the fluid chamber 180 into the lower cylinder chamber 102b. The fluid passage 188 in the valve member 174 is communicated with the fluid chamber 185 through an orifice passage 190. The fluid chamber 185 is communicated with the fluid passage 167 in the piston rod 108. The respective fluid chambers 185 of the left-handed and right-handed hydraulic shock absorbers 169 are communicated with each other through the pipe 168. A compression spring 191 is provided between the valve member 173 and the relief valve 179, and a compression spring 192 is provided between the valve member 174 and the piston rod 108. The slider 172 is resiliently held at the intermediate position by force of these compression springs.

An operation of the suspension apparatus in the third embodiment of the present invention is described below.

As in the case of the first embodiment, while the vehicle is being driven in a straight line, the phase of the stroke of the piston rod 108 in one hydraulic shock absorber 169 is equal to that in the other hydraulic shock absorber 169, relative to vertical movement of the vehicle. Therefore, the two hydraulic shock absorbers 169 become substantially equal in terms of a pressure introduced from the upper cylinder chamber 102a through the fluid passage 189, the fluid chamber 184, the fluid passage 188, the fluid passage 187 and the fluid passage 186 into the fluid chamber 180, so that the slider 172 in each hydraulic shock absorber 169 is held at the intermediate position. Consequently, the extension-stroke and compression-stroke variable pressure control valves 170 and 171 are open, to thereby generate a small damping force during the extension stroke and the compression stroke. Thus, vibration of the vehicle body can be suppressed while maintaining good riding quality.

During cornering, the phase of the stroke of the piston rod 108 in one hydraulic shock absorber 169 is opposite to that in the other hydraulic absorber 169, relative to rolling of the vehicle body. Therefore, the pressure in the upper cylinder chamber 102a (that is, the pressure in the fluid chamber 180) in the hydraulic shock absorber during the extension stroke becomes high and the pressure in the fluid chamber 180 in the hydraulic shock absorber during the compression stroke becomes low. Due to a difference in pressure in the fluid chamber 180 between the two hydraulic shock absorbers, in the hydraulic shock absorber 169 during the extension stroke, the slider 172 moves toward the piston rod 108, so that the valve opening pressure for the extension-stroke variable pressure control valve 170 becomes high and the damping force for the extension stroke becomes large, and that the compression-stroke variable pressure control valve 171 opens and the damping force for the compression stroke becomes small. On the other hand, in the hydraulic shock absorber 169 during the compression stroke, the slider 172 moves toward the relief valve 179, so that the valve opening pressure for the compression-stroke variable pressure control valve 171 becomes high and the damping force for the compression stroke becomes large, and that the extension-stroke variable pressure control valve 170 opens and the damping force for the extension stroke becomes small. Consequently, a large damping force is applied to a change in vehicle attitude, thus effectively suppressing rolling and obtaining good steering stability.

The pressure-receiving area of the piston 105 on a side of the upper cylinder chamber 102a is smaller than that on a side of the lower cylinder chamber 102b. Further, the hydraulic shock absorber is generally arranged so as to generate a large damping force for the extension stroke as compared to the compression stroke. Therefore, in the upper cylinder chamber 102a, a pressure change according to movement of the piston 105 is greater than that in the lower cylinder chamber 102b. In this embodiment, the slider 172 is moved, based on the pressure change in the upper cylinder chamber 102a. This ensures high responsiveness of the apparatus and enables adjustment of the damping force in a wide range. Further, when the vehicle travels over a depression in a road surface and the piston rod 108 largely extends, to thereby sharply increase the pressure in the upper cylinder chamber 102a (that is, the pressure in the fluid chamber 180), the relief valve 179 opens and the hydraulic fluid in the fluid chamber 180 is relieved into the lower cylinder chamber 102b. Therefore, no excessive load is applied to seal portions of the hydraulic shock absorber.

With respect to the direction in which the vehicle after change in attitude returns to a horizontal position, a small damping force is generated, so that the vehicle body can be smoothly returned to the horizontal position. Further, an appropriate damping force can be applied to the movement of the slider 172 by virtue of the orifice passage 190 in the valve member 174, so that malfunctioning due to self-induced vibration can be prevented.

In the first to third embodiments, the hydraulic shock absorbers provided at left and right wheels of a vehicle are connected so as to suppress rolling of the vehicle. However, this should not be construed as limiting the present invention. In the present invention, for suppressing pitching (for example, forward displacement during braking or backward displacement during acceleration) of a vehicle (which may be a two-wheeled vehicle), the hydraulic shock absorbers provided at front and rear wheels of a vehicle may be connected.

What is claimed is:

1. A pilot suspension apparatus capable of biasing a damping valve in a direction for closing the damping valve in response to application of a pilot pressure, said pilot suspension apparatus comprising:
   at least two hydraulic shock absorbers that are capable of controlling a damping force, wherein said at least two hydraulic shock absorbers are to be provided at a front wheel and a rear wheel, respectively, of a vehicle, at a left wheel and a right wheel, respectively, of a vehicle, or at diagonally spaced wheels, respectively, of a vehicle;
   a connecting pipe for connecting said at least two hydraulic shock absorbers to one another; and
   a control valve for controlling the pilot pressure, wherein said control valve is adapted to be controlled by application of a differential pressure generated between respective cylinders of said at least two hydraulic shock absorbers.

2. The pilot suspension apparatus according to claim 1, wherein said connecting pipe is connected via a throttle passage to a variable-volume chamber that has volume elasticity.

3. The pilot suspension apparatus according to claim 1, wherein said control valve includes a disk valve.

4. The pilot suspension apparatus according to claim 1, wherein said control valve is adapted to be controlled by application of a differential pressure generated between respective cylinders of said at least two hydraulic shock absorbers by being adapted to be controlled by application of a differential pressure generated between respective upper chambers of said respective cylinders of said at least two hydraulic shock absorbers.

5. The pilot suspension apparatus according to claim 1, wherein each of the respective cylinders of said at least two hydraulic shock absorbers is divided into an upper chamber and a lower chamber by a piston located within each of the respective cylinders, and wherein the piston includes a first passage for placing the upper chamber in fluid communication with the lower chamber and also includes a valve seat against which the damping valve abuts when the damping valve is closed.

6. The pilot suspension apparatus according to claim 5, wherein the pilot pressure is defined by pressurized fluid within a pilot chamber, and wherein the damping valve is positioned between the first passage and the pilot chamber.

7. The pilot suspension apparatus according to claim 6, wherein the damping valve includes a orifice for placing the pilot chamber in fluid communication with the first passage.

8. The pilot suspension apparatus according to claim 7, wherein the pilot chamber is defined by a portion of a fixing member, and wherein the pilot chamber can be placed in fluid communication with a remote portion of the fixing member, that does not define the pilot chamber, via a second passage.

9. The pilot suspension apparatus according to claim 8, wherein said control valve is for controlling the pilot pressure by controlling a flow of fluid through the second passage.

10. The pilot suspension apparatus according to claim 9, wherein said control valve is for controlling the pilot pressure such that the pilot pressure increases when said control valve interrupts the flow of fluid through the second passage.

11. The pilot suspension apparatus according to claim 1, wherein said control valve is for controlling the pilot pressure such that the pilot pressure increases when said control valve interrupts a flow of fluid away from a pilot chamber, with the pressure of the fluid within the pilot chamber defining the pilot pressure.

12. A pilot suspension apparatus comprising:
   at least two hydraulic shock absorbers that are capable of controlling a damping force, wherein said at least two hydraulic shock absorbers are to be provided at a front wheel and a rear wheel, respectively, of a vehicle, at a left wheel and a right wheel, respectively, of a vehicle, or at diagonally spaced wheels, respectively, of a vehicle; and
   a connecting pipe for connecting said at least two hydraulic shock absorbers to one another;
   wherein each of said at least two hydraulic shock absorbers includes
   (i) a cylinder
   (ii) a damping valve that is capable of being biased in a direction for closing said damping valve,
   (iii) a pilot chamber for holding a pressurized fluid therein, wherein the pressurized fluid serves to bias said damping valve in the direction for closing said damping valve, and
   (iv) a control valve for controlling the pressure of the pressurized fluid within said pilot chamber, wherein said control valve is adapted to be controlled by application of a differential pressure generated between said cylinder of one of said at least two hydraulic shock absorbers and said cylinder of another of said at least two hydraulic shock absorbers.

13. The pilot suspension apparatus according to claim 12, wherein said connecting pipe is connected via a throttle passage to a variable-volume chamber that has volume elasticity.

14. The pilot suspension apparatus according to claim 12, wherein said control valve includes a disk valve.

15. The pilot suspension apparatus according to claim 12, wherein said control valve is adapted to be controlled by application of a differential pressure generated between said cylinder of one of said at least two hydraulic shock absorbers and said cylinder of another of said at least two hydraulic shock absorbers by being adapted to be controlled by application of a differential pressure generated between an upper chamber of said cylinder of said one hydraulic shock absorber and an upper chamber of said another hydraulic shock absorber.

16. The pilot suspension apparatus according to claim 12, wherein said cylinder of each of said at least two hydraulic shock absorbers is divided into an upper chamber and a lower chamber by a piston located within said cylinder, and wherein said piston includes a first passage for placing said upper chamber in fluid communication with said lower chamber and also includes a valve seat against which said damping valve abuts when said damping valve is closed.

17. The pilot suspension apparatus according to claim 16, wherein said damping valve is positioned between said first passage and said pilot chamber.

18. The pilot suspension apparatus according to claim 17, wherein said damping valve includes a orifice for placing said pilot chamber in fluid communication with said first passage.

19. The pilot suspension apparatus according to claim 18, wherein said pilot chamber is defined by a portion of a fixing member, and wherein said pilot chamber can be placed in fluid communication with a remote portion of said fixing member, that does not define said pilot chamber, via a second passage.

20. The pilot suspension apparatus according to claim 19, wherein said control valve is for controlling the pressure of the pressurized fluid within said pilot chamber by controlling a flow of fluid through said second passage.

21. The pilot suspension apparatus according to claim 20, wherein said control valve is for controlling the pressure of the pressurized fluid within said pilot chamber such that the pressure of the pressurized fluid within said pilot chamber increases when said control valve interrupts the flow of fluid through said second passage.

22. The pilot suspension apparatus according to claim 12, wherein said control valve is for controlling the pressure of the pressurized fluid within said pilot chamber such that the pressure of the pressurized fluid within said pilot chamber increases when said control valve interrupts a flow of fluid away from said pilot chamber.

* * * * *